United States Patent [19]

Glew et al.

[11] 4,137,296

[45] Jan. 30, 1979

[54] PRODUCTION OF CHLORINE DIOXIDE

[75] Inventors: David N. Glew; E. Colin W. Clarke, both of Sarnia, Canada

[73] Assignee: The Dow Chemical Company, Midland, Mich.

[21] Appl. No.: 737,885

[22] Filed: Nov. 2, 1976

[30] Foreign Application Priority Data

Oct. 26, 1976 [CA] Canada .................................. 264159

[51] Int. Cl.² .............................................. C01B 11/02
[52] U.S. Cl. ..................................... 423/478; 423/500
[58] Field of Search ........................ 423/478, 500, 504

[56] References Cited

U.S. PATENT DOCUMENTS

| | | | |
|---|---|---|---|
| 2,280,938 | 4/1942 | Vincent | 423/478 UX |
| 2,484,402 | 10/1949 | Day et al. | 423/478 |
| 2,936,219 | 5/1960 | Rapson | 423/478 |
| 3,816,077 | 6/1974 | Fuller et al. | 423/478 X |
| 3,933,987 | 1/1976 | Schulz et al. | 423/478 |
| 3,975,506 | 8/1976 | Cowley | 423/478 |
| 4,051,229 | 9/1977 | Isa et al. | 423/478 |
| 4,075,308 | 2/1978 | Rapson et al. | 423/478 |
| 4,079,123 | 3/1978 | Fuller et al. | 423/478 |

FOREIGN PATENT DOCUMENTS

| | | | |
|---|---|---|---|
| 624903 | 8/1961 | Canada | 423/478 |
| 956784 | 10/1972 | Canada | 423/478 |
| 969735 | 6/1975 | Canada | 423/478 |
| 674808 | 7/1952 | United Kingdom | 423/478 |

*Primary Examiner*—Brian Hearn
*Attorney, Agent, or Firm*—Robert W. Selby

[57] ABSTRACT

A method is disclosed to produce chlorine dioxide from sodium chlorate by reacting the chlorate with HCl. The method comprises forming in a reaction vessel an aqueous reaction medium containing at least about 5.5 moles per liter of the sodium chlorate, sufficient HCl to provide an acid normality of at least about 0.002, and sufficient sodium chloride to saturate the reaction medium; boiling the reaction medium at a temperature of up to about 100° C.; and withdrawing a mixture containing chlorine dioxide gas, chlorine gas and water vapor from the reaction vessel.

28 Claims, 1 Drawing Figure

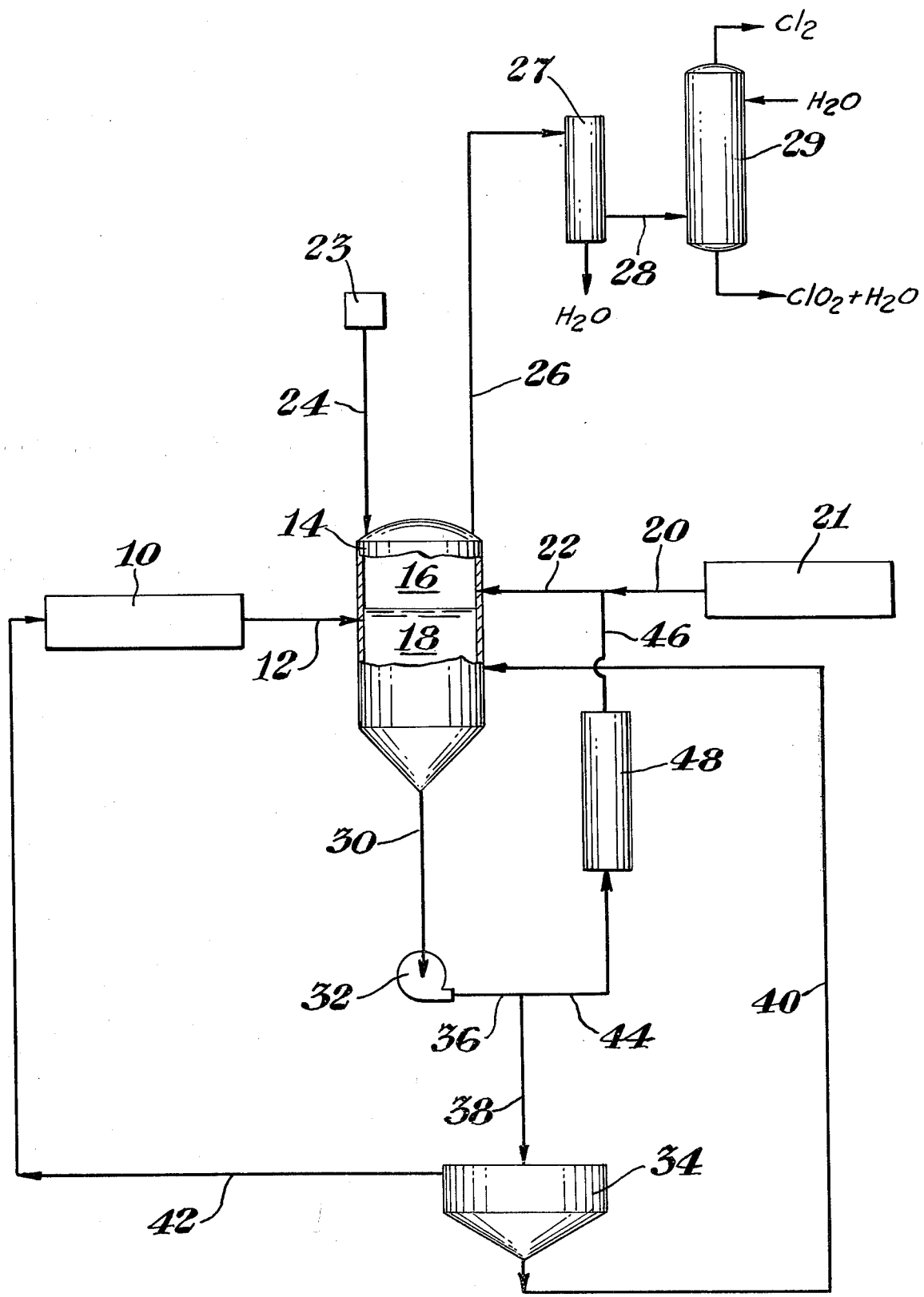

PRODUCTION OF CHLORINE DIOXIDE

BACKGROUND OF THE INVENTION

This invention relates to a method to produce chlorine dioxide and more in particular to a method to produce chlorine dioxide by reacting an alkali metal chlorate with a strong acid.

It has been found that chlorine dioxide can conveniently be used for the bleaching of wood pulp. Chlorine dioxide, however, is known to be an explosively endothermic compound. As such, it generally cannot be shipped safely from a manufacturer to the pulp mill consumer. Consequently, chlorine dioxide is usually generated on-site as required by the pulp mill.

Chlorine dioxide commonly is produced by the reduction of a chlorate salt by a chloride salt in an acidic medium. Although operable acids include hydrochloric, perchloric, phosphoric and sulfuric acids, from a commercial standpoint, sulfuric acid has been generally found to be most satisfactory.

Chlorine dioxide is produced from the reaction of sodium chlorate with sodium chloride in a sulfuric acid medium in accord with the equation:

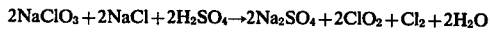
$$2NaClO_3 + 2NaCl + 2H_2SO_4 \rightarrow 2Na_2SO_4 + 2ClO_2 + Cl_2 + 2H_2O$$

Alternatively, chlorine dioxide can be produced from the reaction of sodium chlorate with hydrogen chloride in a sulphuric acid medium in accordance with the equation:

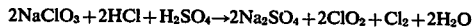
$$2NaClO_3 + 2HCl + H_2SO_4 \rightarrow 2Na_2SO_4 + 2ClO_2 + Cl_2 + 2H_2O$$

In both cases the production of chlorine dioxide using a sulphuric acid medium leads to the coproduction of sodium sulfate, the disposal of which poses an unsolved and increasingly more difficult environmental problem.

Canadian Pat. Nos. 956,784 and 969,735 describe processes to produce chlorine dioxide from the reaction of an alkali metal chlorate, such as sodium chlorate, and hydrochloric acid in accordance with the equation:

$$2NaClO_3 + 4HCl \rightarrow 2NaCl + 2ClO_2 + Cl_2 + 2H_2O$$

In such an HCl process the production of chlorine dioxide results in the coproduction of sodium chloride, which can be advantageously used as, for example, a feed stock for an electrolytic cell to produce sodium chlorate.

The known processes to produce chlorine dioxide by reacting an alkali metal chlorate with HCl have oftentimes not been commercially successful. It is desired, therefore, to provide an efficient process to form chlorine dioxide from an alkali metal chlorate without the production of an alkali metal sulfate.

SUMMARY OF THE INVENTION

It has been found that chlorine dioxide can be efficiently produced from an alkali metal chlorate by reacting sodium chlorate with HCl. The method comprises forming in a reaction vessel an aqueous reaction medium containing at least about 5.5 moles per liter of sodium chlorate, sufficient HCl to provide an acid normality of at least about 0.002 and sufficient sodium chloride to saturate the reaction medium; boiling the reaction medium at a temperature of up to about 100° C.; and withdrawing a mixture including chlorine dioxide gas, chlorine gas and water vapor from the reaction vessel.

BRIEF DESCRIPTION OF THE DRAWING

The single FIGURE of the drawing schematically represents one embodiment of the described process for producing chlorine dioxide.

DESCRIPTION OF THE PREFERRED EMBODIMENTS

It is generally desirable to produce chlorine dioxide on a continuous basis rather than by a single batch method. The present invention continuously produces chlorine dioxide by reacting HCl with sodium chlorate in a reaction vessel containing an aqueous reaction medium. The reaction medium includes the sodium chlorate, sodium chloride and HCl. The continuous method comprises feeding sufficient sodium chlorate into the vessel to provide at least about 5.5 moles per liter of the sodium chlorate; feeding sufficient HCl into the vessel to provide a reaction medium with an acid normality of at least about 0.002; maintaining the reaction medium at boiling by maintaining the temperature within the range of from about 40° to about 100° C. and the pressure within the vessel within the range of from about 40 to about 500 millimeters of mercury absolute; continuously removing chlorine dioxide gas, chlorine gas and water vapor from the vessel; continuously withdrawing from the vessel a slurry containing a portion of the reaction medium and solid sodium chloride particles; separating the sodium chloride particles from the slurry and returning the liquid portion of the slurry to the vessel; and separating the gaseous chlorine from the chlorine dioxide reaction product.

More preferably, a continuous method to produce chlorine dioxide by reacting HCl and sodium chlorate within a reaction zone containing an aqueous reaction medium including HCl, sodium chlorate and sodium chloride consists essentially of feeding a sufficient amount of an aqueous solution containing sodium chlorate into the reaction zone to provide a reaction medium with about 5.5 to about 9.2 moles per liter of sodium chlorate; feeding a sufficient amount of HCl into the reaction zone to provide a reaction medium acidity of from about 0.002 to about 6 normal; maintaining the reaction medium at boiling by maintaining the temperature within the range of from about 40° to about 100° C. and the pressure within the vessel within the range of from about 40 to about 500 millimeters of mercury absolute; continuously withdrawing a slurry containing a portion of the reaction medium and solid sodium chloride particles from the reaction zone, removing solid sodium chloride from the withdrawn slurry to provide a slurry effluent, and returning the effluent to the reaction zone; adding HCl to the withdrawn slurry; feeding an inert diluent gas into a gas zone superimposing the reaction zone; and separating the gaseous chlorine from the chlorine dioxide reaction product. If desired the HCl can be added directly to the slurry effluent before the effluent is recycled to the reaction vessel.

The presence of catalytic amounts of certain catalysts in the reaction medium can enhance the efficiency of the process. Suitable catalysts are selected from at least one member of the group consisting of manganese dioxide and inorganic chromium, lead, manganese and silver compounds. Catalytic compounds such as $Na_2Cr_2O_7 \cdot 2H_2O$, $CrCl_3$, $(Cr(OH)_3$, $CrO$, $Cr_2O_3$, $AgCl$, $AgNO_3$, $MnCl_2$, $MnCl_3$ and $PbCl_2$ can be dissolved in the reaction medium. The catalyst is introduced into the reaction vessel in an amount sufficient to maintain the concentration of the desired catalyst at up to about 27 weight percent chromium, up to about 1.5 grams per liter silver, or up to about 10 grams per liter manganese. When manganese dioxide is fed into the vessel, the concentration of the dioxide suspended in the reaction medium is up to about 13 grams per liter. Preferably, a sufficient amount of a soluble chromium compound catalyst, such as sodium dichromate, is added to the aqueous reaction medium to provide a chromium concentration of about 8 to about 12 grams per liter of reaction medium. Greater amounts of the specified catalysts are operable, but are not necessary for satisfactory performance of the process. The catalyst can be added directly to the reaction vessel or can be premixed in the sodium chlorate feed to the vessel.

In a preferred embodiment, the sodium chlorate concentration within the reaction medium is maintained at from about 6.1 to about 8 molar. Even more preferably sufficient sodium chlorate is fed into the reaction medium to form a solution which is substantially entirely saturated with sodium chlorate.

In practice of the embodiment illustrated in the drawing, sodium chlorate feed can be produced by, for example, electrolyzing an aqueous sodium chloride solution in an electrolytic cell 10. Optionally, solid sodium chlorate can be dissolved in water to provide a suitable sodium chlorate feed solution. The sodium chlorate from the electrolytic cell 10 is passed through conduit 12 into a reaction vessel 14 having a gas zone 16 and a reaction zone 18.

The reaction zone preferably contains an aqueous reaction medium consisting essentially of sodium chlorate, sodium chloride, HCl and, more preferably, a catalytic amount of dissolved chromium. HCl, preferably in the gaseous or, more preferably, the anhydrous liquid form, passes through conduit 20 from an HCl supply source 21, mixes with recycled reaction medium in conduit 22 and thereafter passes into the gas zone 16 of the reaction vessel 14. If desired, a dilute or concentrated aqueous solution of HCl can be employed. Generally, however, a concentrated form of HCl is used. Optionally, the HCl can be charged directly into the reaction zone 18 of the reaction vessel 14. The amount of HCl charged into the reactor is preferably sufficient to provide a reaction medium with an acid normality of about 0.002 to about 6, more preferably about 0.002 to about 2.5 and even more preferably about 0.01 to about 0.4.

The reaction vessel is maintained under a temperature and suitably reduced pressure to cause the reaction medium to boil and evaporate water during the reaction between the sodium chlorate and HCl. Most preferably such temperature is from about 60° to about 80° C. The most preferred pressure within the reaction vessel is from about 100 to about 240 millimeters of mercury absolute. under such operating conditions HCl can react with sodium chlorate to produce chlorine and chlorine dioxide. Water produced during such reaction is evaporated from the reaction medium and enters into the gas zone 16 with gaseous chlorine dioxide and chlorine. The presence of the water vapor within the gas zone 16 assists in minimizing the explosion hazard of the chlorine dioxide.

An inert gas, such as air, carbon dioxide, nitrogen or steam, is fed to the reactor 14 from an inert gas source 23 through a suitable conduit 24. The inert gas assists in reducing the explosion hazard of the chlorine dioxide. Preferably the inert gas introduced into the gas zone 16 is substantially free of chlorine. It has been found that the use of a substantially chlorine-free inert gas will improve the uniformity of chlorine dioxide production in the herein described process.

The gaseous reaction products including chlorine dioxide, chlorine and water vapor together with the inert gas exit the reaction vessel 14 through conduit 26. Preferably the reaction products are continuously removed through conduit 26 by means of a vacuum which can be produced by well-known means. Improved performance can be achieved by minimizing the chlorine concentration in the vapor zone 16.

The reaction products flow from conduit 26 into a condensing means, such as gas cooler 27, to condense water from the reaction products. Thereafter, the products pass through a conduit 28 into a means, such as absorption tower 29, to separate the chlorine from the reaction products and form an aqueous solution containing up to about 10 grams per liter of chlorine dioxide.

During the reaction between sodium chlorate and HCl in the single reaction zone 18, solid sodium chloride particles are produced thereby forming a slurry composed of the reaction medium and the sodium chloride particles. A portion of the slurry is removed from the reaction zone 18 and transferred through conduit 30 to an optional pump 32 and to a separating means, such as a centrifuge or a filter 34, through conduits or pipes 36 and 38. At least a portion and preferably the majority of the solid sodium chloride is removed from the slurry by the filter 34. The effluent from the filter 34 is returned to the reaction zone 18 through conduit 40. The solid sodium chloride separated in the filter 34 can be neutralized to form a slurry which is pumped through a conduit 42 to the sodium chlorate cell 10. Alternatively, the solid sodium chloride separated on the filter 34 can be neutralized and washed as is well-known in the art to remove supernatant liquor. The resulting solid sodium chloride can be used in other processes.

It is desirable to agitate the reaction mixture during the course of the reaction to maintain the solid sodium chloride in suspension within such mixture and also to maximize the efficiency of the process relative to the chlorine dioxide produced. Such agitation can be achieved by stirring with, for example, an impeller type device, but is preferably accomplished by withdrawing a portion of the slurry from the reaction zone 18 through the conduit 30 and the pump 32. The slurry is returned to the gas zone 16 through conduits 36, 44, 46 and 22. A heat exchanger 48 can be used to assist in regulating the temperature of the reaction medium. The rate at which the slurry is withdrawn through conduit 30 can vary, however, a rate sufficient to withdraw the total volume of the reaction medium in the reaction zone 18 within up to about two minutes has been found to be acceptable. In general, it is desirable to rapidly circulate the reaction medium.

The following examples are illustrative of the invention.

EXAMPLES 1–60

Chlorine dioxide was generated by the reduction of sodium chlorate with HCl in a boiling aqueous reaction medium as hereinafter described. A cylindrically shaped Pyrex glass reaction vessel with a volume of about 200 milliliters was used to contain the aqueous reaction medium. The reaction vessel had suitable entrance ports in the lower portion, or reaction zone, of the vessel for the addition of HCl and an inert gas into the reaction mixture. An upper exit port was provided for the removal of steam, chlorine dioxide and chlorine from the upper portion, or gas zone, of the vessel.

In each of the examples for which data is shown in Tables I and II the reaction medium consisted of sodium chlorate, sodium chloride, HCl, water, and, when noted in Table II, a catalyst. 100 Milliliter volumes of sodium chlorate, sodium chloride, water and a catalyst, when used, were mixed in the reaction vessel and continuously agitated by means of a Teflon coated magnetic bar spinning at the bottom of the vessel. The vessel, containing the HCl-free portion of the reaction medium, was maintained at a predetermined constant temperature by immersion in a water bath. The exit port of the reaction vessel was physically connected to an upwardly positioned air condenser leading to a vacuum trap containing a neutral potassium iodide solution.

Immediately prior to the initiation of the chlorine dioxide production, an aspirator vacuum was applied to the potassium iodide trap and after constant conditions were obtained, a steady flow of steam was distilled from the reaction medium, refluxed in the air condenser, and condensed in the solution of potassium iodide. To stabilize the steam distillation and condensation, a very small amount of air or nitrogen was passed continuously through the reaction medium and into the potassium iodide solution. When constant boiling conditions were established, a predetermined amount of concentrated aqueous HCl was fed into the reaction medium and the reaction products collected in the potassium iodide trap for a period of 30 minutes. The above described agitation was continued throughout the reaction.

The data shown in Tables I and II were obtained by forming chlorine dioxide substantially as hereinabove described. In each of the examples the reaction medium was saturated with sodium chloride.

Examples in Table II were carried out using chromium, manganese or silver reaction catalysts which were added to the reaction medium before introduction of the HCl into the vessel.

The reaction efficiency represents the weight percent of sodium chlorate which has reacted to form chlorine dioxide.

TABLE I

| | | | Reaction Medium Without Catalyst | | |
|---|---|---|---|---|---|
| Example[1] | Pressure (mm/Hg) | Temp. (°C.) | Initial NaClO$_3$ Concentration (mol/liter) | Initial HCl Concentration (mol/liter) | Efficiency (%) |
| 1[2] | 40 | 40 | 5.49 | 0.10 | 81.0 |
| 2 | 40 | 40 | 5.49 | 1.21 | 91.8 |
| 3 | 40 | 40 | 5.49 | 1.21 | 89.5 |
| 4 | 105 | 60 | 6.73 | 1.21 | 90.4 |
| 5 | 105 | 60 | 6.73 | 1.21 | 91.1 |
| 6 | 105 | 60 | 5.80 | 1.21 | 89.7 |
| 7 | 170 | 70 | 5.76 | 2.42 | 87.0 |
| 8 | 165 | 70 | 6.45 | 1.21 | 89.3 |
| 9[2] | 165 | 70 | 6.60 | 0.10 | 81.3 |
| 10[2] | 160 | 70 | 7.36 | 0.10 | 84.3 |
| 11 | 160 | 70 | 7.36 | 1.21 | 89.9 |
| 12 | 160 | 70 | 7.36 | 2.42 | 90.5 |
| 13 | 160 | 70 | 7.36 | 2.42 | 91.1 |
| 14 | 255 | 80 | 5.73 | 1.21 | 87.1 |
| 15 | 240 | 80 | 7.99 | 1.21 | 90.2 |
| 16 | 240 | 80 | 7.99 | 2.42 | 90.9 |
| 17 | — | 90 | 5.70 | 1.21 | 85.0 |
| 18 | 350 | 90 | 8.63 | 1.21 | 89.1 |
| 19 | 350 | 90 | 8.63 | 2.42 | 90.2 |

[1]All examples were carried out with an aqueous reaction medium saturated with NaCl
[2]Reaction medium did not boil continuously as in the remaining examples

TABLE II

| | | | Reaction Medium with Catalyst[2] | | | |
|---|---|---|---|---|---|---|
| Example[1] | Pressure (mm/Hg) | Temp (°C.) | Gram Cr/liter[3] | Gram Mn/liter | Gram Ag/liter[4] | Efficiency (%) |
| 20 | 65 | 50 | — | — | — | 90.8 |
| 21 | 65 | 50 | 33 | — | — | 92.5 |
| 22 | 105 | 60 | — | — | — | 90.4 |
| 23 | 105 | 60 | 33 | — | — | 91.2 |
| 24 | 160 | 70 | — | — | — | 91.0 |
| 25 | 160 | 70 | — | — | — | 90.4 |
| 26 | 160 | 70 | — | — | — | 90.5 |
| 27 | 160 | 70 | — | — | — | 91.1 |
| 28 | 160 | 70 | 2.5 | — | — | 93.0 |
| 29 | 160 | 70 | 6.2 | — | — | 93.7 |
| 30 | 160 | 70 | 12 | — | — | 93.5 |
| 31 | 160 | 70 | 25 | — | — | 93.5 |
| 32 | 160 | 70 | 25 | — | — | 94.2 |
| 33 | 160 | 70 | 34 | — | — | 93.1 |
| 34 | 160 | 70 | 50 | — | — | 93.3 |
| 35 | 160 | 70 | 50 | — | — | 93.4 |
| 36 | 160 | 70 | 50 | — | — | 94.1 |
| 37 | 160 | 70 | 50 | — | — | 94.5 |
| 38[5] | 160 | 70 | — | 3.2 | — | 91.8 |
| 39[5] | 160 | 70 | — | 13 | — | 94.6 |
| 40 | 160 | 70 | — | — | 0.05 | 89.9 |
| 41 | 160 | 70 | — | — | 0.10 | 90.9 |
| 42 | 160 | 70 | — | — | 0.25 | 91.8 |
| 43 | 160 | 70 | — | — | 1.0 | 93.0 |
| 44 | 160 | 70 | — | — | 1.5 | 92.8 |
| 45 | 240 | 80 | — | — | — | 90.2 |

TABLE II-continued

| Example[1] | Pressure (mm/Hg) | Temp (°C.) | Reaction Medium with Catalyst[2] Gram Cr/liter[3] | Gram Mn/liter | Gram Ag/liter[4] | Efficiency (%) |
|---|---|---|---|---|---|---|
| 46 | 240 | 80 | — | — | — | 90.9 |
| 47 | 240 | 80 | 7.3 | — | — | 92.7 |
| 48 | 240 | 80 | 34 | — | — | 93.4 |
| 49 | 240 | 80 | 34 | — | — | 92.1 |
| 50 | 240 | 80 | 72 | — | — | 93.0 |
| 51 | 240 | 80 | 72 | — | — | 93.4 |
| 52 | — | 80 | 130 (8.6 wt. % Cr) | — | — | 93.6 |
| 53 | — | 80 | (16 wt. % Cr) | — | — | 94.3 |
| 54 | — | 80 | (27 wt. % Cr) | — | — | 92.5 |
| 55[6] | 240 | 80 | — | 23 | — | 95.6 |
| 56 | — | 85 | — | — | — | 90.3 |
| 57 | — | 85 | 35 | — | — | 92.2 |
| 58 | 350 | 90 | — | — | — | 90.2 |
| 59 | 350 | 90 | 35 | — | — | 92.8 |
| 60 | — | 90 | (26 wt. % Cr) | — | — | 93.9 |

[1] All examples were carried out with an aqueous reaction medium saturated with both NaCl and NaClO$_3$ and an average normality of about 0.05 to about 0.5 of HCl
[2] All concentrations based on liters of final solution
[3] Cr was added as sodium dichromate
[4] Ag was added as AgNO$_3$
[5] Mn was added as MnO$_2$
[6] Mn was added as MnCl$_2$

EXAMPLES 61–70

Chlorine dioxide was continuously produced at a rate of about one ton per day in a plant substantially the same as schematically shown in the drawing save for the means by which the sodium chlorate was provided to the reaction vessel. The sodium chlorate feed solution was usually formed by dissolving solid sodium chlorate in water and pumping this solution into the reaction vessel as shown in the drawing. Operation using electrolytic chlorate cell effluent was also proven to be satisfactory. Sodium chloride filtered from the reaction medium was suitably packaged and returned to an electrolytic chlorate plant.

Chlorine dioxide was formed by reducing sodium chlorate with HCl in a boiling aqueous reaction medium saturated with sodium chloride. Sufficient gaseous HCl was added to the reaction medium to result in a desired acid normality. The temperature of the reaction medium was controlled to within the range of about 67° to 72° C. and the absolute pressure maintained at about 140 to 200 millimeters mercury.

Table III summarizes the results of 209 efficiency measurements taken over a nine month period of operation without the use of a catalyst and of 120 measurements obtained over a three month period of time during which a chromium catalyst was added to the reaction medium to improve the efficiency of the chlorine dioxide generation.

Chlorine dioxide was efficiently produced from an aqueous sodium chlorate solution by the described process.

TABLE III

| Example[1] | Reaction medium Concentration[2] NaClO$_3$ (mol/liter) | Reaction efficiency E (%) |
|---|---|---|
| 61 | 5.40 | 86.5 |
| 62 | 5.87 | 86.8 |
| 63 | 6.34 | 88.1 |
| 64 | 6.81 | 88.7 |
| 65 | 7.28 | 89.1 |
| 66[3] | 5.40 | 91.8 |
| 67[3] | 5.87 | 92.3 |
| 68[3] | 6.34 | 92.5 |
| 69[3] | 6.81 | 92.2 |
| 70[3] | 7.28 | 93.5 |

[1] Examples 61–65 represent averages of 209 measurements Examples 66–70 represent averages of 120 measurements
[2] Operating conditions: a. reaction medium saturated with NaCl b. acid normality of 0.05 for Examples 61–65 and 0.10 for Examples 66–70 c. temperature of reaction solution about 67 to 72° C d. reactor pressure of about 140 to 200 mm Hg absolute
[3] Sufficient sodium dichromate added to the reaction solution to produce a chromium concentration of 8 to 12 grams/liter of solution

EXAMPLES 71–74

Chlorine dioxide was produced substantially as described for Examples 1–60 using a compound containing lead to improve the efficiency of the reactions. The lead was added and PbCl$_2$, which dissolved, and is believed to have ionized, in the reaction medium. The initial concentration of HCl in the initial aqueous solution containing sodium chlorate and sodium chloride was 0.5 to 3.6 normal. After the reaction to produce chlorine dioxide was carried out at 70° C., the HCl concentration was 0.01 to 0.05 normal.

In separate examples, PbCl$_2$ was added to the reaction solution in quantities sufficient to produce dissolved lead concentrations of 2.5, 11.7, 29.0 and 59.0 grams of lead per liter of solution. The reaction efficiencies achieved in these examples were 92.5, 93.9, 93.7 and 94.6 respectively.

What is claimed is:

1. A method to produce chlorine dioxide from an alkali metal chlorate by reacting the chlorate with HCl comprising maintaining in a reaction vessel an aqueous reaction medium containing at least 5.5 moles per liter of sodium chlorate, sufficient HCl to provide an acid normality of at least about 0.002 and sufficient sodium chloride to saturate the reaction medium; boiling the reaction medium at a temperature of up to about 100° C.; and withdrawing a mixture including chlorine dioxide gas, chlorine gas and water vapor from the reaction vessel.

2. The method of claim 1 is wherein the temperature is maintained at from about 40° to about 100° C.

3. The method of claim 2 wherein sufficient HCl is added to the reaction medium to maintain an acidity of about 0.002 to about 6 normal.

4. The method of claim 2 wherein sufficient HCl is added to the reaction medium to maintain an acidity of about 0.002 to about 2.5 normal.

5. The method of claim 2 wherein sufficient HCl is added to the reaction medium to maintain an acidity of about 0.01 to about 0.4 normal.

6. The method of claim 2 wherein the sodium chlorate concentration is from 5.5 to about 9.2 molar.

7. The method of claim 2 wherein the reaction medium is maintained boiling at a temperature of about 60° to about 80° C. and a pressure of about 100 to about 240 millimeters of mercury absolute, the sodium chlorate concentration is maintained at about 6.1 to about 8 molar by feeding an aqueous solution of the sodium chlorate into the reaction medium, the acidity of the reaction medium is maintained at about 0.01 to about 0.4 normal and the reaction medium is saturated with the sodium chloride.

8. The method of claim 7 wherein the chlorine concentration of a vapor zone superimposing a reaction zone within the reaction container is minimized by continuously withdrawing gaseous chlorine from the vapor zone and feeding a substantially chlorine-free inert gas into the vapor zone.

9. The method of claim 8 wherein the inert gas is selected from the group consisting of air, carbon dioxide, nitrogen and steam.

10. The method of claim 7 including the additional step of agitating the reaction mixture during the reaction.

11. The method of claim 1 wherein the temperature is maintained at from about 60° to about 80° C.

12. A continuous method to produce chlorine dioxide by reacting HCl with sodium chlorate in a reaction vessel containing an aqueous reaction medium including sodium chlorate, sodium chloride and HCl comprising feeding sufficient sodium chlorate into the vessel to maintain a concentration of at least 5.5 moles per liter of the sodium chlorate; feeding sufficient HCl into the vessel to provide a reaction medium with an acid normality of at least about 0.002; maintaining the reaction medium at boiling by maintaining the temperature within the range of from about 40° to about 100° C., and the pressure within the vessel within the range of from about 40 to about 500 millimeters of mercury absolute; continuously removing chlorine dioxide gas, chlorine gas and water vapor from the vessel; continuously withdrawing from the vessel a slurry containing a portion of the reaction medium and solid sodium chloride particles; separating solid sodium chloride particles from the slurry and returning the liquid portion of the slurry to the vessel; and separating the gaseous chlorine from the chlorine dioxide reaction product.

13. The method of claim 12 wherein the temperature is maintained at from about 60° to about 80° C.

14. The method of claim 13 wherein the sodium chlorate concentration within the reaction medium is from 6.1 to about 8 molar.

15. The method of claim 13 wherein the sodium chlorate concentration is from 5.5 to about 9.2 molar.

16. The method of claim 13 wherein the reaction medium is maintained boiling at a temperature of about 60° to about 80° C. and a pressure of about 100 to about 240 millimeters of mercury absolute, the sodium chlorate concentration is maintained at about 6.1 to about 8 molar by feeding an aqueous solution of the sodium chlorate into the reaction medium, the acidity of the reaction medium is maintained at about 0.01 to about 0.4 normal and the reaction medium is saturated with the sodium chloride.

17. The method of claim 12 wherein the pressure is maintained at from about 40 to 350 millimeters of mercury absolute.

18. A continuous method to produce chlorine dioxide by reacting HCl and sodium chlorate within a reaction zone containing an aqueous reaction medium including HCl, sodium chlorate and sodium chloride consisting essentially of feeding a sufficient amount of an aqueous solution containing sodium chlorate into the reaction zone to provide a reaction medium with 5.5 to about 9.2 moles per liter of sodium chlorate; feeding a sufficient amount of HCl into the reaction zone to provide a reaction medium acidity of from about 0.002 to about 6 normal; maintaining the reaction medium at boiling by maintaining the temperature within the range of from about 40° to about 100° C. and the pressure within the vessel within the range of from about 40 to 350 millimeters of mercury absolute; continuously withdrawing a slurry containing a portion of the reaction medium and solid sodium chloride particles from the reaction zone, removing solid sodium chloride from the withdrwawn slurry to profide a slurry effluent, and returning the effluent to the reaction zone; adding HCl to the withdrawn slurry; feeding an inert diluent gas into a gas zone superimposing the reaction zone; and separating the gaseous chlorine from the chlorine dioxide reaction product.

19. The method of claim 18 wherein the reaction medium is maintained boiling at a temperature of about 60° to about 80° C. and a pressure of about 100 to about 240 millimeters of mercury absolute, the sodium chlorate concentration is maintained at about 6.1 to about 8 molar by feeding an aqueous solution of the sodium chlorate into the reaction medium, the acidity of the reaction medium is maintained at about 0.01 to about 0.4 normal and the reaction medium is saturated with the sodium chloride.

20. The method of claim 19 including adding a catalytic amount of sodium dichromate to the reaction mixture.

21. A method to produce chlorine dioxide from an alkali metal chlorate by reacting the chlorate with HCl comprising forming in a reaction vessel an aqueous reaction medium containing at least about 5.5 moles per liter of sodium chlorate, sufficient HCl to provide an acid normality of at least about 0.002 and sufficient sodium chloride to saturate the reaction medium; boiling the reaction medium at a temperature of from about 60° to about 80° C. and a pressure of from about 100 to about 240 millimeters mercury absolute; and withdrawing a mixture including chlorine dioxide gas, chlorine gas and water vapor from the reaction vessel.

22. A method to produce chlorine dioxide from an alkali metal chlorate by reacting the chlorate with HCl comprising maintaining in a reaction vessel an aqueous reaction medium containing from about 6.1 to about 8 moles per liter of sodium chlorate, sufficient HCl to provide an acid normality of at least about 0.002 and sufficient sodium chloride to saturate the reaction medium; boiling the reaction medium at a temperature of from about 40° to about 100° C.; and withdrawing a mixture including chlorine dioxide gas, chlorine gas and a water vapor from the reaction vessel.

23. A method to produce chlorine dioxide from an alkali metal chlorate by reacting the chlorate with HCl comprising maintaining in a reaction vessel an aqueous reaction medium containing at least 5.5 moles per liter of sodium chlorate and substantially entirely saturated with sodium chlorate, sufficient HCl to provide an acid normality of at least about 0.002 and sufficient sodium chloride to saturate the reaction medium; boiling the reaction medium at a temperature of from about 40° to about 100° C.; and withdrawing a mixture including chlorine dioxide gas, chlorine gas and a water vapor from the reaction vessel.

24. A method to produce chlorine dioxide from an alkali metal chlorate by reacting the chlorate with HCl comprising maintaining in a reaction vessel an aqueous reaction medium containing at least 5.5 moles per liter of sodium chlorate, sufficient HCl to provide an acid normality of at least about 0.002; sufficient sodium chloride to saturate the reaction medium and a catalytic amount of a catalyst selected from the group consisting of manganese dioxide and compounds of chromium, lead, manganese and silver; boiling the reaction medium at a temperature of up to about 100° C.; and withdrawing a mixture including chlorine dioxide gas, chlorine gas and water vapor from the reaction vessel.

25. The method of claim 24 wherein catalyst is sodium dichromate.

26. A continuous method to produce chlorine dioxide by reacting HCl with sodium chlorate in a reaction vessel containing an aqueous reaction medium including sodium chlorate, sodium chloride and HCl comprising feeding sufficient sodium chlorate into the vessel to maintain a substantially entirely saturated concentration of at least 5.5 moles per liter sodium chlorate in the reaction medium; feeding HCl into the vessel to provide the reaction medium with an acid normality of at least about 0.002; maintaining the reaction medium at boiling by maintaining the temperature within the range of from about 60° to about 80° C., and the pressure within the vessel within the range of from about 40 to about 500 millimeters of mercury absolute; continuously removing chlorine dioxide gas, chlorine gas and water vapor from the vessel; continuously withdrawing from the vessel a slurry containing a portion of the reaction medium and solid sodium chloride particles; separating solid sodium chloride particles from the slurry and returning the liquid portion of the slurry to the vessel; and separating the gaseous chlorine from the chlorine dioxide reaction product.

27. A method to produce chlorine dioxide from an alkali metal chlorate by reacting the chlorate with HCl comprising maintaining in a reaction vessel an aqueous reaction medium containing greater than about 6.1 moles per liter of sodium chlorate, sufficient HCl to provide an acid normality of at least about 0.002 and sufficient sodium chloride to saturate the reaction medium; boiling the reaction medium at a temperature of up to about 100° C.; and withdrawing a mixture including chlorine dioxide gas, chlorine gas and water vapor from the reaction vessel.

28. A method to produce chlorine dioxide from an alkali metal chlorate by reacting the chlorate with HCl comprising maintaining in a reaction vessel an aqueous medium containing at least 5.5 moles per liter of sodium chlorate, sufficient HCl to provide an acid normality of at least about 0.002 and sufficient sodium chloride to saturate the reaction medium; boiling the reaction medium at a pressure of about 40 to 350 millimeters of mercury absolute and a temperature of up to about 100° C.; and withdrawing a mixture including chlorine dioxide gas, chlorine gas and water vapor from the reaction vessel.

* * * * *

UNITED STATES PATENT AND TRADEMARK OFFICE
CERTIFICATE OF CORRECTION

PATENT NO. : 4,137,296
DATED : January 30, 1979
INVENTOR(S) : David N. Glew and E. Colin W. Clarke It is certified that error appears in the above-identified patent and that said Letters Patent are hereby corrected as shown below:

On the cover page, under "Assignee", delete "The Dow Chemical Company, Midland, Michigan" and insert --Dow Chemical of Canada, Ltd., Ontario, Canada--.

Column 1, the formula on line 34 should be as follows:
--$2NaClO_3 + 2HCl + H_2SO_4 \longrightarrow Na_2SO_4 + 2ClO_2 + Cl_2 + 2H_2O$--.

Column 2, the formulas on lines 66, 67 and 68 should be as follows:
--$Na_2Cr_2O_7 \cdot 2H_2O$, $CrCl_3$, $Cr(OH)_3$, $CrO$, $Cr_2O_3$, $AgCl$, $AgNO_3$, $MnCl_2$, $MnCl_3$ and $PbCl_2$--.

Column 3, line 58, change the "u" in the word "under" to --Under--.

UNITED STATES PATENT AND TRADEMARK OFFICE
CERTIFICATE OF CORRECTION

PATENT NO. : 4,137,296
DATED : January 30, 1979
INVENTOR(S) : David N. Glew and E. Colin W. Clarke It is certified that error appears in the above-identified patent and that said Letters Patent are hereby corrected as shown below:

Column 10, Claim 18, line 26, delete "withdrwawn" and insert --withdrawn--.

Column 10, Claim 18, line 27, delete "proride" and insert --provide--.

Column 12, Claim 28, line 26, add the word --reaction-- at the end of the line after the word "aqueous".

Signed and Sealed this

Twenty-ninth Day of May 1979

[SEAL]

Attest:

RUTH C. MASON
Attesting Officer

DONALD W. BANNER
Commissioner of Patents and Trademarks